June 5, 1962
T. S. HIGGINS ET AL
3,037,715
BOBBIN CONDITIONING MACHINE
Filed May 21, 1958
11 Sheets-Sheet 1
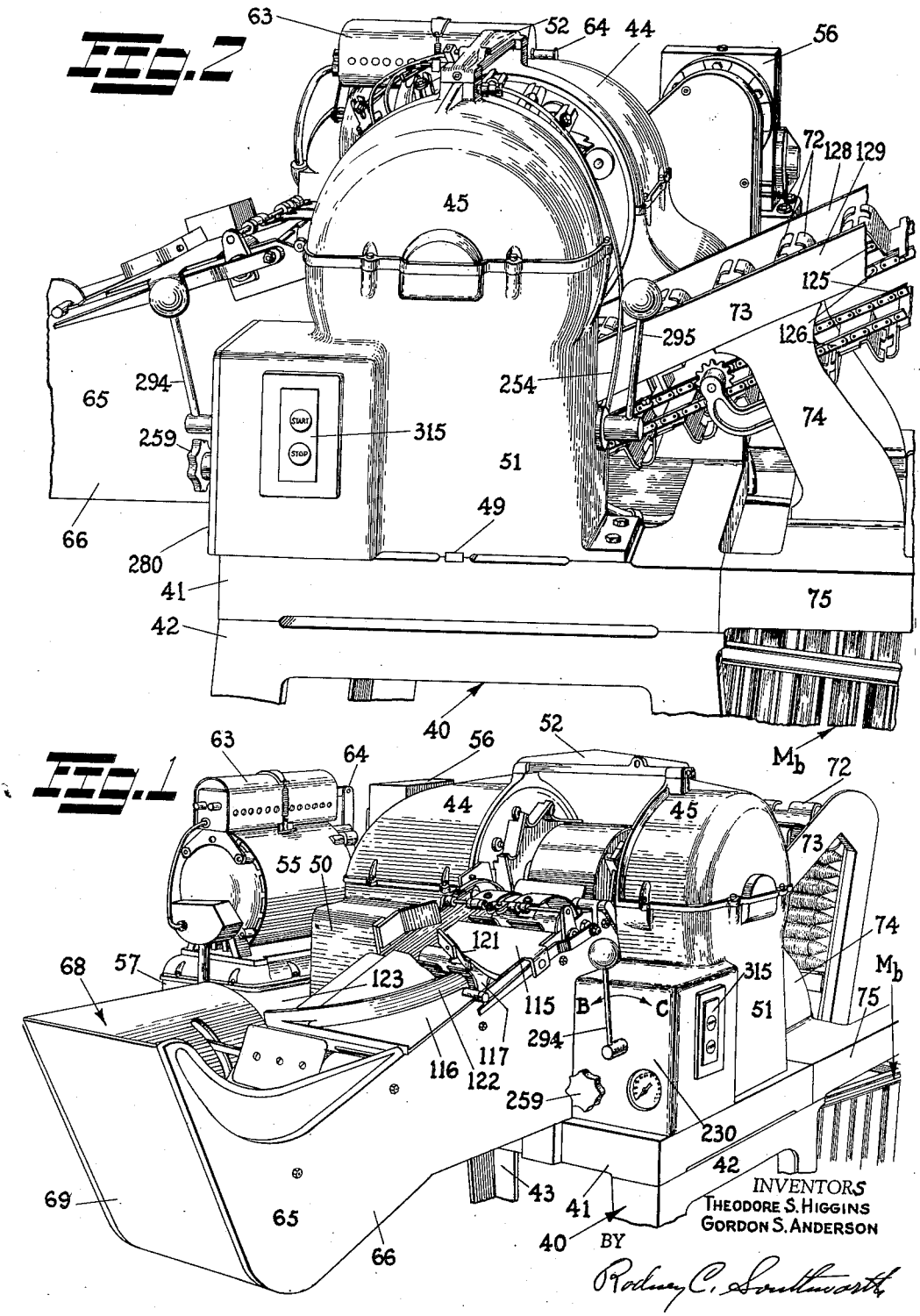
INVENTORS
THEODORE S. HIGGINS
GORDON S. ANDERSON
BY
ATTORNEY

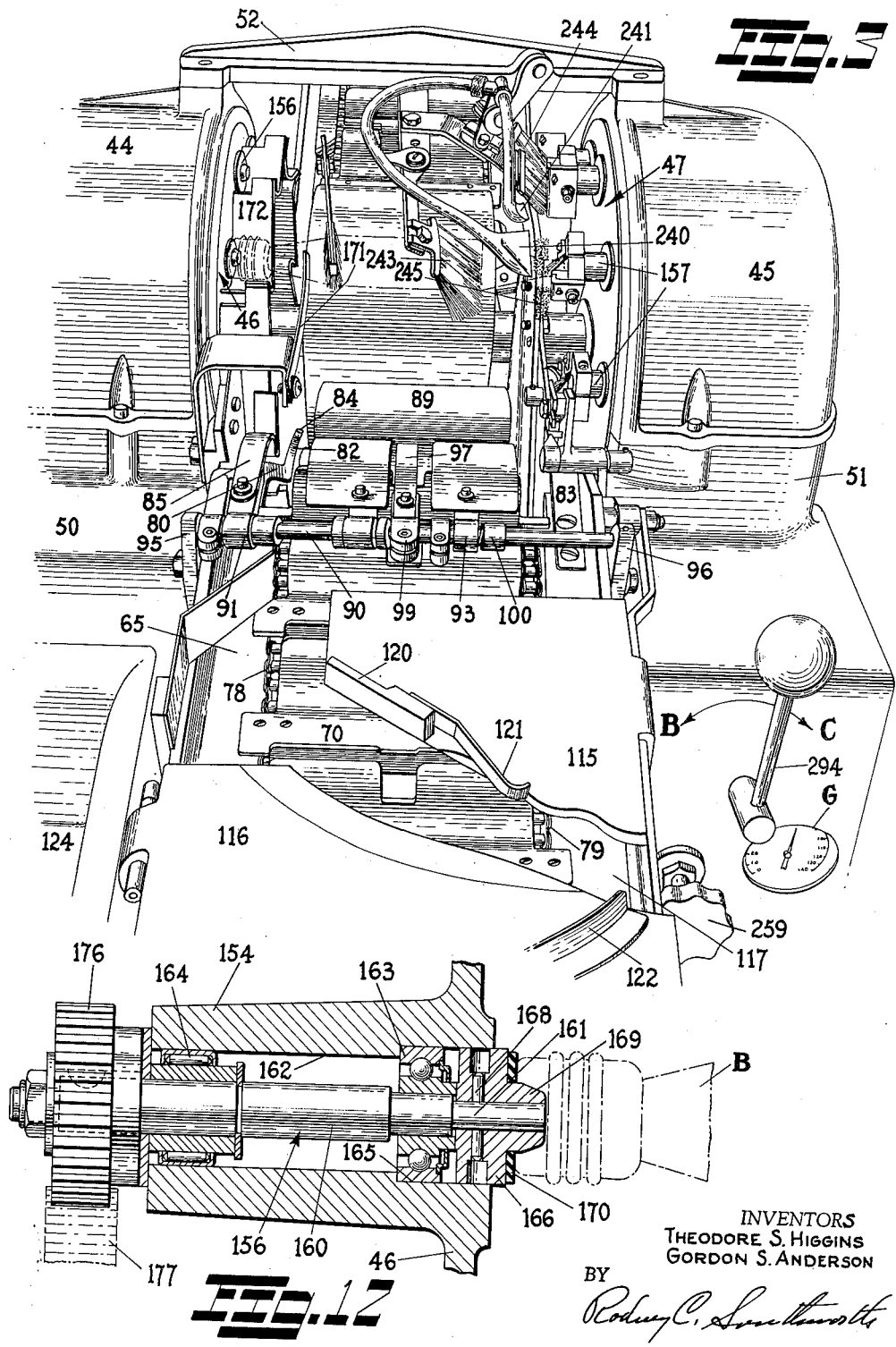

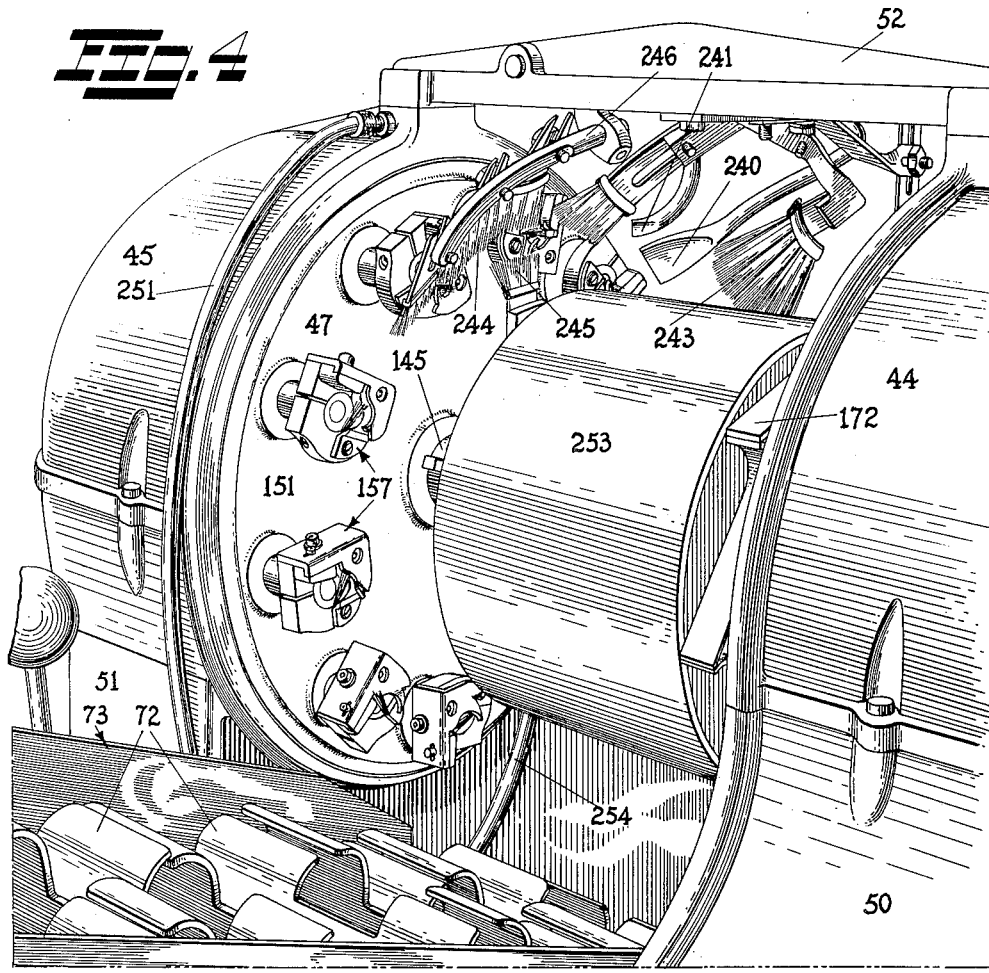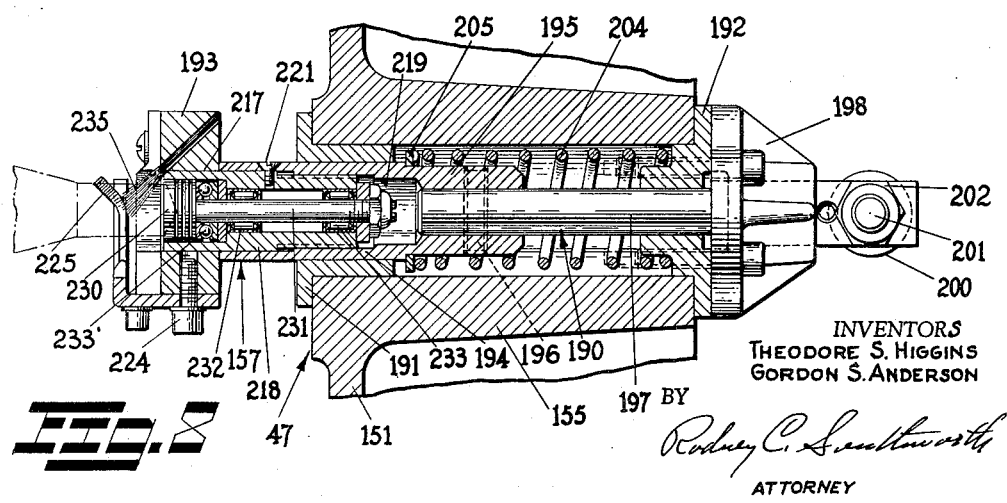

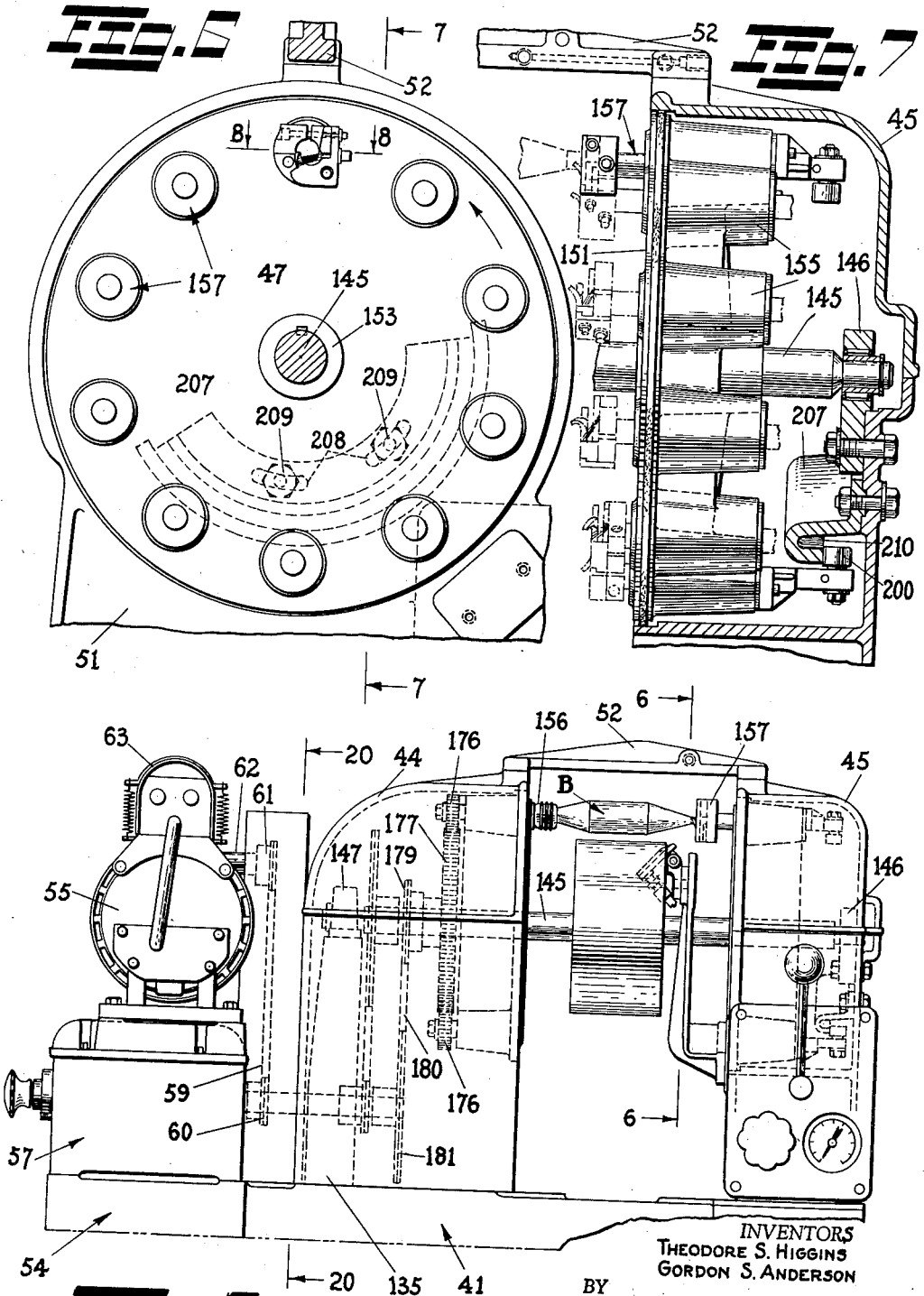

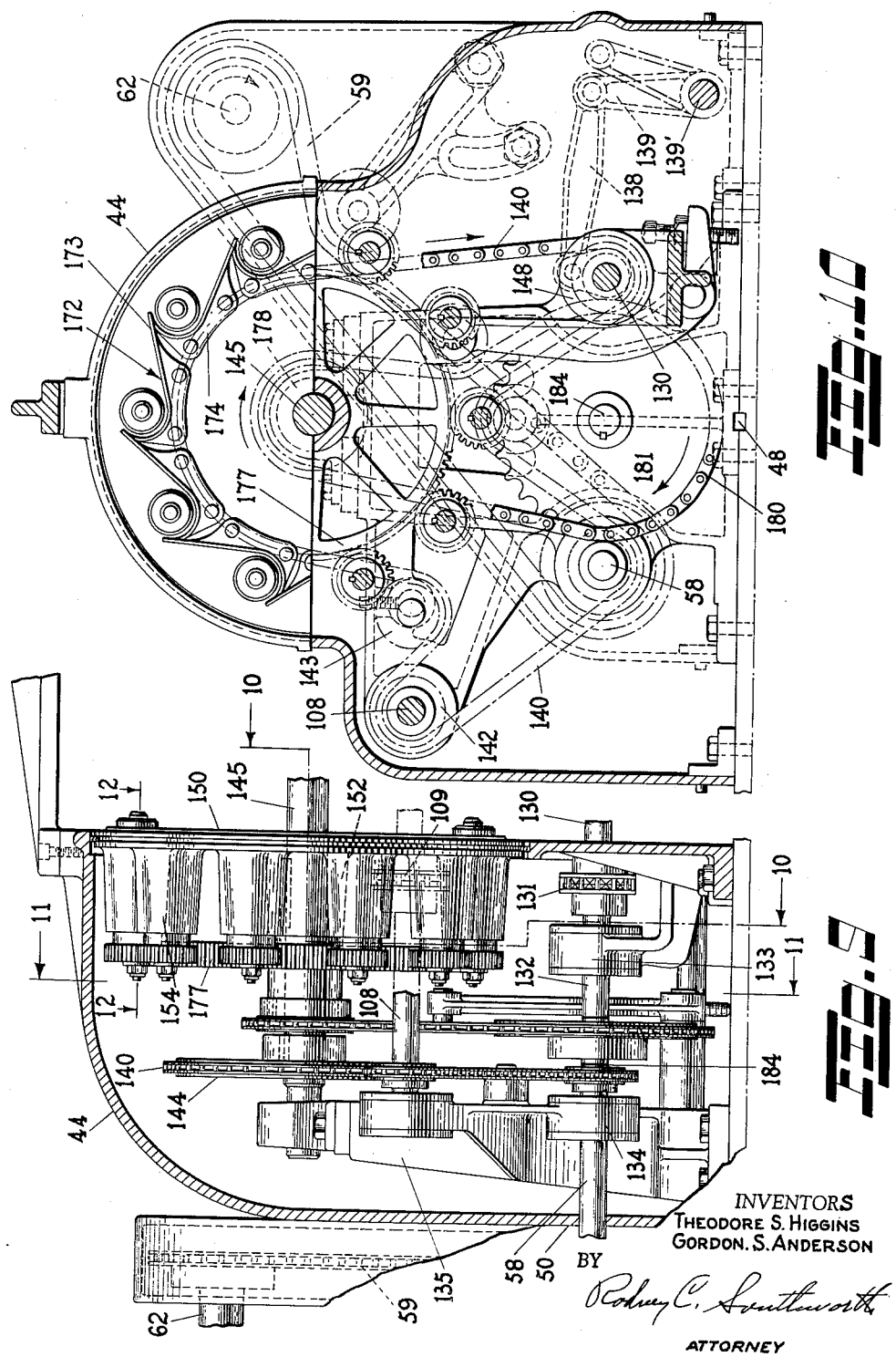

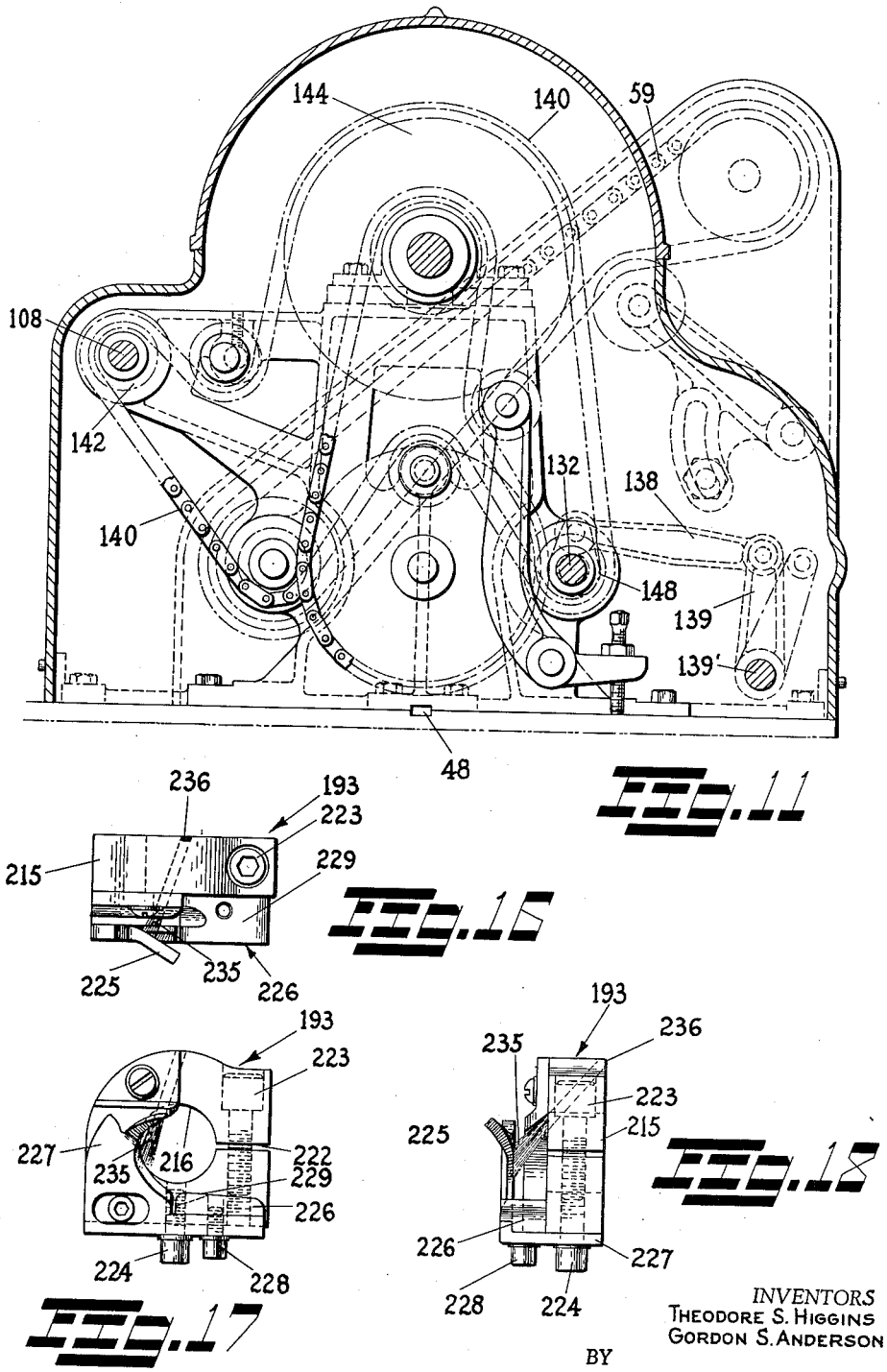

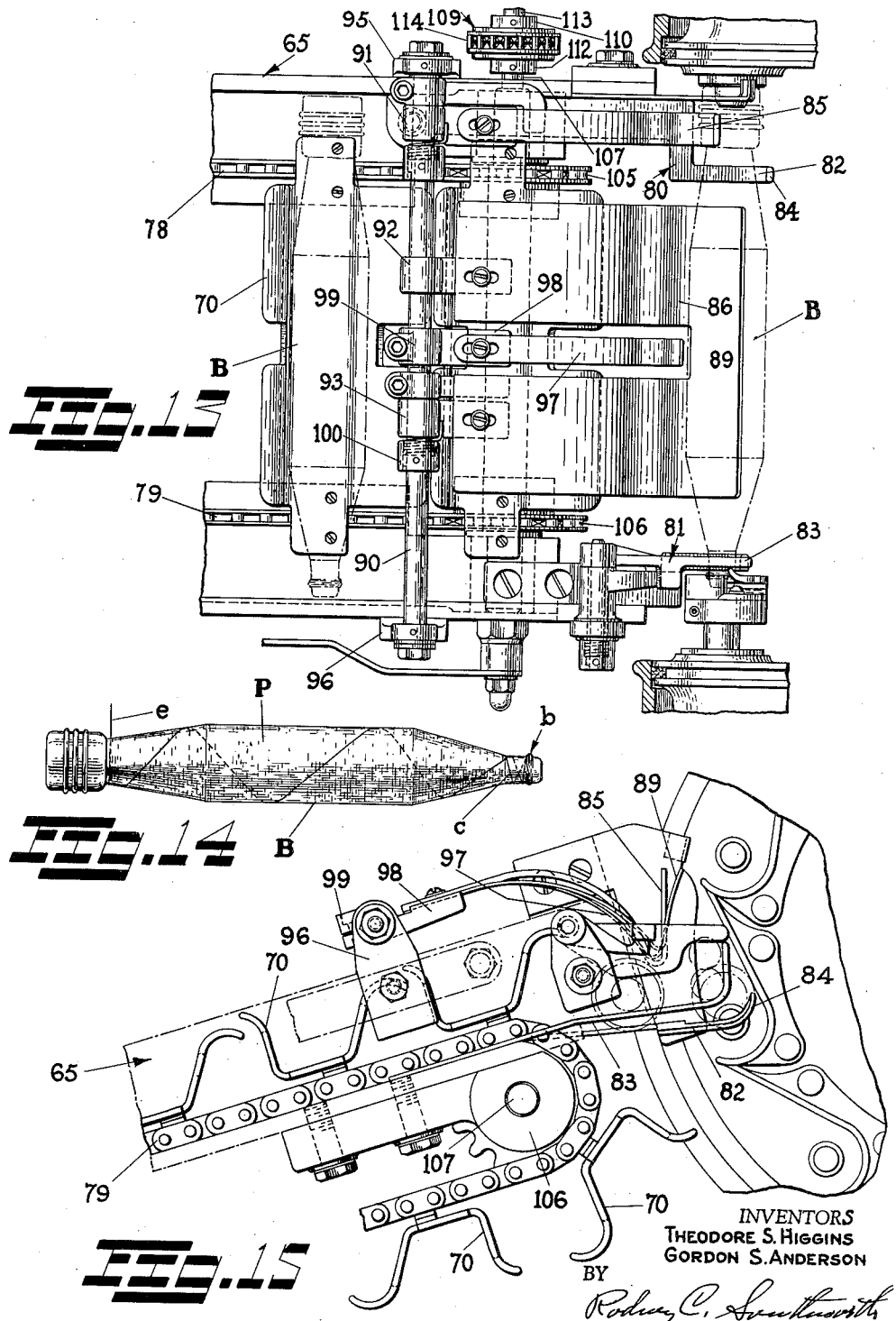

June 5, 1962
T. S. HIGGINS ET AL
3,037,715
BOBBIN CONDITIONING MACHINE
Filed May 21, 1958
11 Sheets-Sheet 8
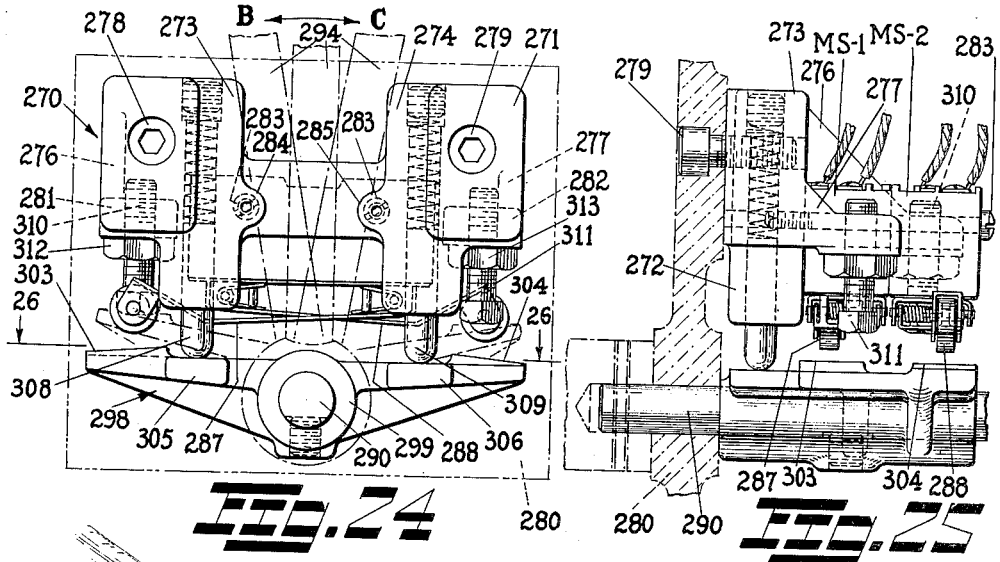
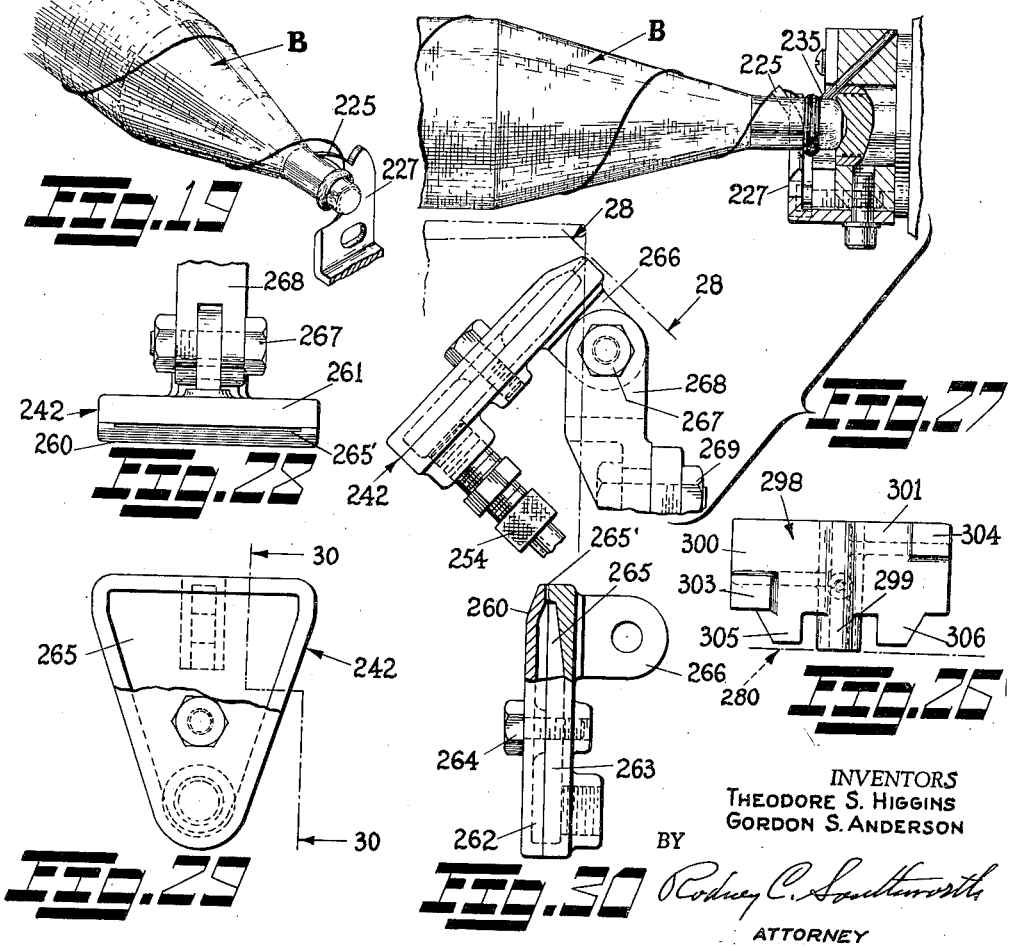
INVENTORS
THEODORE S. HIGGINS
GORDON S. ANDERSON
BY
Rodney C. Southworth
ATTORNEY

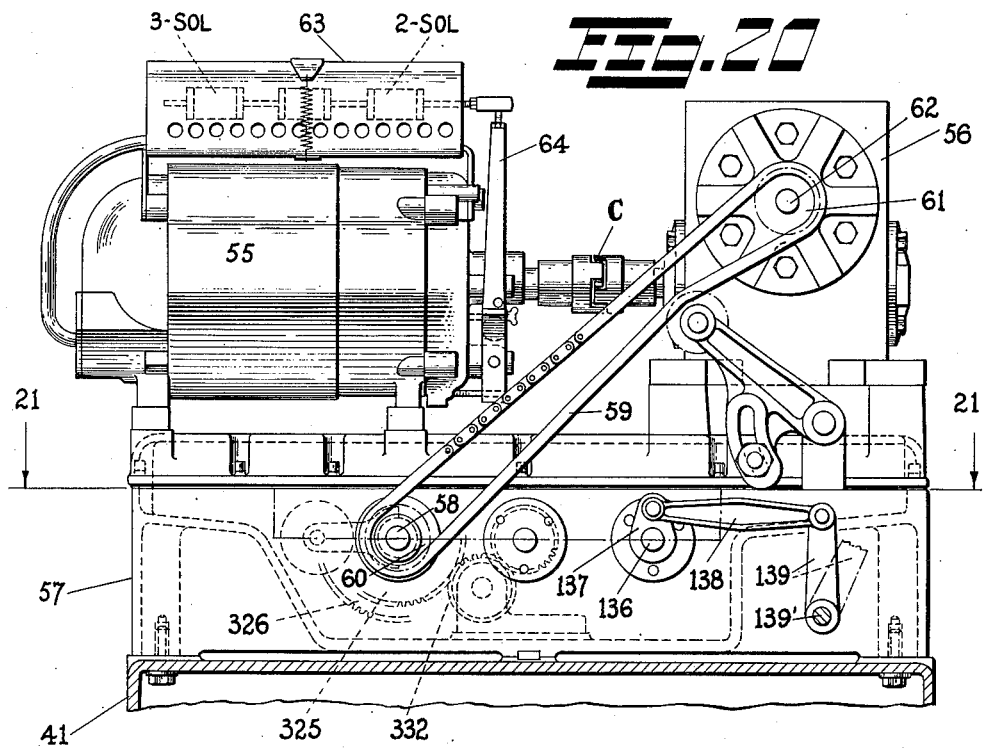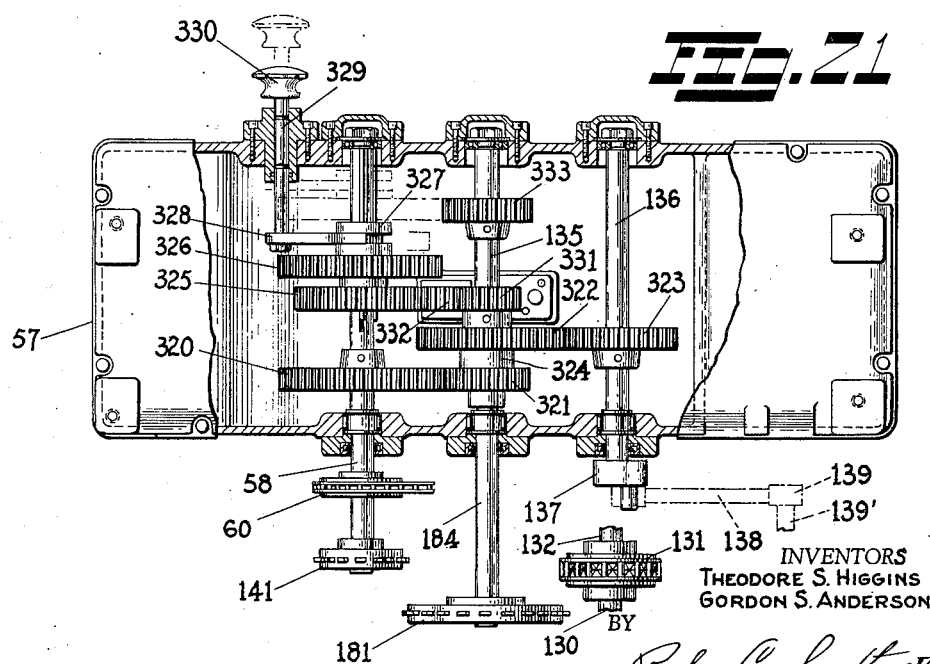

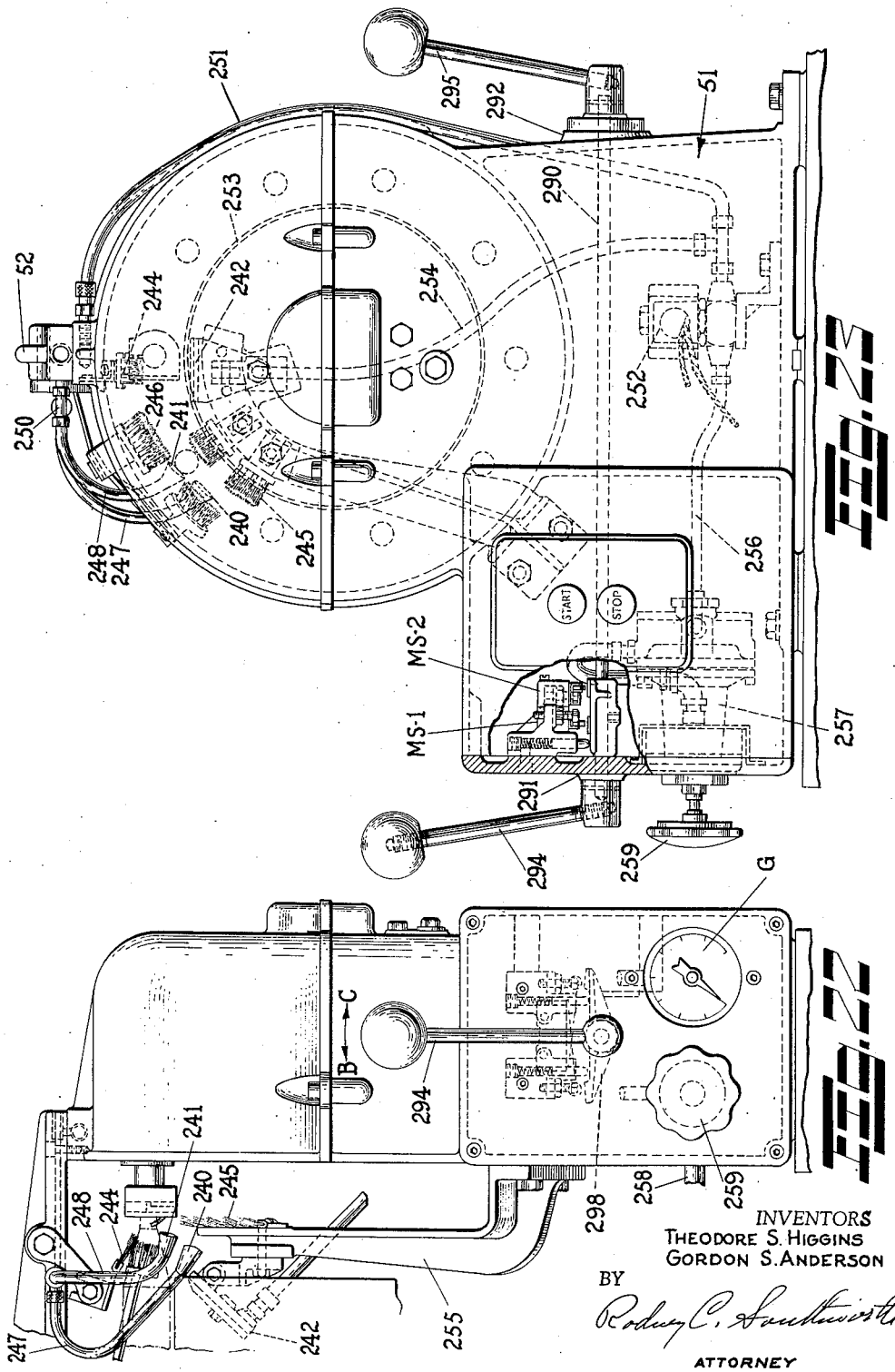

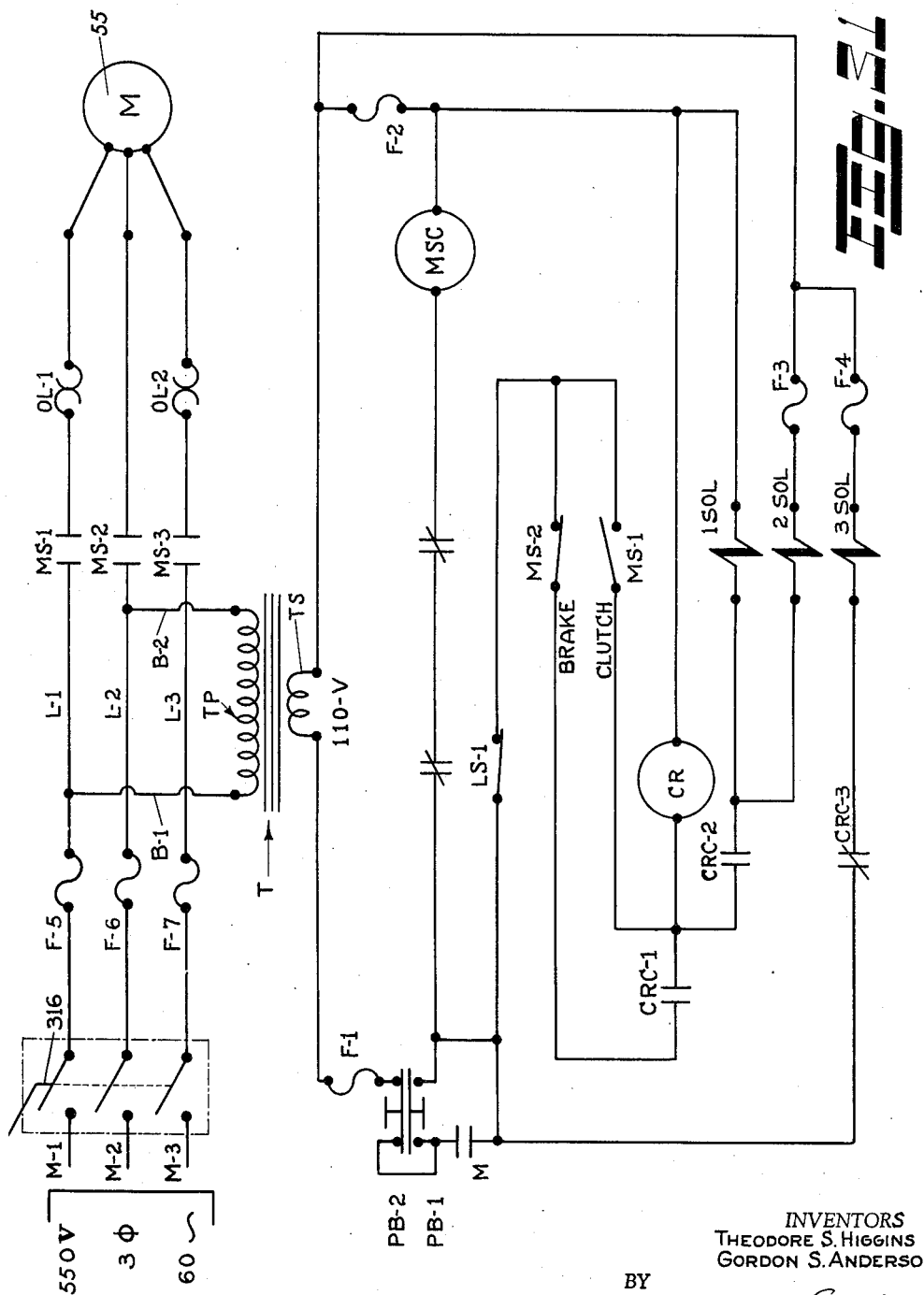

United States Patent Office 3,037,715
Patented June 5, 1962

3,037,715
BOBBIN CONDITIONING MACHINE
Theodore S. Higgins, Woonsocket, R.I., and Gordon S. Anderson, Framingham, Mass., assignors to Draper Corporation, Hopedale, Mass., a corporation of Maine
Filed May 21, 1958, Ser. No. 736,788
21 Claims. (Cl. 242—18)

This invention relates to apparatus for preparation of filling wound packages on bobbins adapted for use in automatic, replenishing looms, and more particularly, to a mechanism for finding and removing the tail wind left on such packages after spinning and/or rewinding and then winding it onto a tip bunch also formed during the said spinning or winding of the package.

It is a general object of the invention to devise a machine or apparatus which will automatically and mechanically locate the end or tail wind left after forming an end-finder tip bunch, removing that end from its position and adding it to the existing tip bunch by winding it on that bunch.

It is a further object of the invention to accomplish the above mentioned object by a combined mechanical and pneumatic means.

A further object of the present invention is to provide a machine or apparatus which is of rigid and compact construction, and reliable and efficient in operation, and which is capable of accomplishing these objects on each bobbin of a series of bobbins as they are progressively advanced through the machine.

A still further and particular object of the invention is to provide apparatus of the type indicated which will be entirely automatic in operation when once set in motion by the operator, and which will require no attention on his part during its normal operation except that needed to replenish and maintain in the feeding device of the machine a supply of filled bobbins requiring treatment.

Another object of the invention is to provide a machine of the type indicated in which certain of the elements of the machine are operated and/or controlled by solenoids, and in the electric circuit of which there is included a manual self-restoring type of central switch operating device for effecting selective energization of the solenoids to initiate the operation of such machine elements in a predetermined sequence or for a definite duration.

The invention now will be described in detail by reference to one specific embodiment thereof as illustrated in the accompanying figures of drawing, wherein:

FIG. 1 is a pictorial view of a complete filling package refining machine, as viewed offside from the front or bobbin-feeding end thereof, and embodying the features of the present invention.

FIG. 2 is a pictorial side view of the main section of the machine illustrated in FIG. 1 looking toward the right side thereof, and further showing at the front and rear ends thereof the adjoining fragmental end portions of the respective conveyor mechanisms employed for feeding bobbins the packages of which are to be refined into a turret unit of the machine and for conveying them after treatment to a magazine loading mechanism.

FIG. 3 is a fragmentary pictorial view to a larger scale looking toward and down at the front of the turret device of the FIG. 1 machine and showing the upper end of the conveyor mechanism for delivering the packages to the turret heads for processing.

FIG. 4 is a close-up fragmentary pictorial view looking sidewise and downwards from the back at the tip end winding head of the turret device of the FIG. 1 machine.

FIG. 5 is a front elevational view of the FIG. 1 machine, with the turret bobbin feeding conveyor device omitted, but showing the turret and bobbin drive means and the means for holding the bobbins during processing.

FIG. 6 is a vertical elevational view to a larger scale and partly in section showing the arrangement of the turret lip end supporting spindles and taken substantially on the line 6—6 of FIG. 5, looking in the direction of the arrows.

FIG. 7 is a fragmentary vertical sectional view taken substantially on the line 7—7 of FIG. 6, looking in the direction of the arrows.

FIG. 8 is a sectional view of one of the turret head tip end supporting spindles and mounting, taken substantially on the line 8—8 of FIG. 6, looking in the direction of the arrows.

FIG. 9 is a fragmentary vertical sectional view, similar to FIG. 7, but showing details of the driving mechanism and arrangement of the bobbin butt driving spindles in the opposite turret head unit.

FIG. 10 is a vertical section taken substantially on the line 10—10 of FIG. 9 showing the drive for the two conveyor devices.

FIG. 11 is a vertical section taken substantially on the line 11—11 of FIG. 9 showing the main drive arrangement of the butt spindle turret head.

FIG. 12 is a horizontal section taken substantially on the line 12—12 of FIG. 9, looking in the direction of the arrows, and showing the drive and mounting structure of one of the bobbin butt supporting spindles.

FIG. 13 is a plan view of the transfer mechanism from the bobbin feeding conveyor to the turret device.

FIG. 14 is an elevational view of a wound thread package as received for processing in the machine of the present invention.

FIG. 15 is a fragmentary elevational view showing the upper end of the bobbin-feeding conveyor mechanism in operating position to the turret device for transferring a bobbin thereto for processing.

FIGS. 16, 17 and 18 are plan, front, and side views, respectively, showing details of one of the bobbin tip supporting and winding head units carried by each of the turret tip end spindles.

FIG. 19 is a pictorial view diagrammatically depicting the guiding of the ballooning thread end onto the tip bunch of the bobbin.

FIG. 20 is a view partly in elevation and partly in section taken substantially on the line 20—20 of FIG. 5 showing the main drive to the gear transmission unit and the motor and gear-reducer coupled together, the transmission chain cover guard being omitted.

FIG. 21 is a longitudinal sectional view taken substantially on the line 21—21 of FIG. 20.

FIG. 22 is a front view of the tip spindle turret head showing the air control means for the air blast system.

FIG. 23 is a side elevation looking toward the left side of FIG. 22 and showing the air blast system.

FIG. 24 is a detail view in front elevation of the electric control switch arrangement.

FIG. 25 is a detail view in side elevation of the switch shown in FIG. 24 as viewed from the right side thereof.

FIG. 26 is a detail plan view, to a smaller scale, of the microswitch trip lever shown in FIG. 24, and taken substantially on line 26—26 thereof.

FIG. 27 is a fragmentary view in side elevation and partly in section showing one of the air-blast nozzles in operating position for ballooning the thread end onto the guide hook of the winding head, and also the angular brush for guiding and tensioning such thread end during winding from the hook onto the tip bunch of the bobbin.

FIG. 28 is a top view of the air-blast nozzle shown in FIG. 27 and taken substantially on the line 28—28 of that figure.

FIG. 29 is a front view, partly in elevation and partly in section, of the air-blast nozzle shown in FIG. 28 but with the forked swivel mounting support omitted.

FIG. 30 is a view, partly in section and partly in elevation of the air-blast nozzle shown in FIG. 29, and taken substantially on the line 30—30 thereof; and FIG. 31 is a schematic circuit diagram of the electric circuits employed for the various switches, solenoids, and controls used with the machine in the illustrated embodiment of the present invention.

*General Machine Organization*

The present invention is directed specifically to an automatic filling package processing machine especially designed to handle a plurality of filling carriers or bobbins, either spun wound or rewinds, of the general type illustrated in FIG. 14, and as indicated therein by the reference letter B, in which each of such bobbins is provided at its tip end portion with an end-finding tip bunch *b* wound above and jointed by a connector thread *c* to its wound main yarn mass or thread package P. While the term "bobbin" is, of course, normally applied to the core or holder upon which thread is wound in some type of package, for brevity or facility in description, the term will hereinafter be employed to denote not only the core but also may be considered to include the package on the core. Such bobbins, after being received in the machine or apparatus of the present invention, are subjected individually and in succession to the action of certain devices and mechanisms, as will be hereinafter described in detail, to relocate and install the usual tail wind *e* in an accessible and advantageous position on the tip bunch following its removal from the surface of the main body of the package.

Referring now to FIGS. 1 and 2 of the drawings, the machine shown has a principal supporting frame structure generally designated by the reference numeral 40, having a top horizontal bed member 41 mounted upon and suitably affixed to two upright open side members 42 and 43 which serve as legs for supporting the bed member 41 above the floor. Mounted upon the top bed member 41 and disposed laterally thereof in opposed spaced relation to each other are two turret units 44 and 45 at which the actual end-lifting transferring, locating, and placing of the tail wind *e* onto the customary tip end bunch *b* of each bobbin B take place. The opposing ends of the turret units, as thus arranged, include the rotatable circular turret heads generally indicated at 46 and 47, respectively, FIG. 3, which are interconnected so as to rotate in unison and adapted with bobbin butt holder and bobbin tip holder instrumentalities, as will be hereafter described, to sustain a circularly-arranged series of filled bobbins B, FIG. 14, the turret heads thus acting conjointly as a rotary bobbin carrier to progressively present such bobbins individually to the various devices which act thereon to effect the results above named, as will be hereinafter described.

Furthermore, in the arrangement of the machine the turret units 44 and 45 are substantially centrally disposed upon opposite marginal strip-like portions of the top bed member 41. Precise alignment of the turret heads is established and maintained by means of keys 48 and 49, see FIGS. 2 and 10, that occupy precisely aligned key seats in the abutting surfaces of the bed member 41 and the respective housing members 50 and 51 of the turret units 44 and 45. The keys 48 and 49 and their respective key seats are machined, before use, and their dimensions and tolerances are fixed to give a predetermined close fit to establish and assure correct axial alignment of the turret heads, and also of their interconnected and/or cooperating parts. A suitable cross-brace or spreader 52 rigidly holds the upper part of the two turret units 44 and 45 apart.

The top bed member 41 has attached thereto a lateral extension member 54, FIG. 5, upon which is mounted an assemblage of the main power and drive units of the machine and these are comprised of an electric motor 55 directly coupled, as by a coupling C, to a conventional gear-type speed reducer 56, both being carried by a gear transmission unit 57 the power input shaft 58 of which is chain driven, as by a roller type transmission chain 59 and sprockets 60 and 61, FIGS. 5 and 20, from the output shaft 62 of the speed reducer unit 56.

The electric motor 55 is of the so-called power transmitter type, of known construction, and having combined therewith a clutch and a brake which are solenoid operated, as indicated generally at 63, in conjunction with appropriate lever mechanism, as indicated at 64, see FIGS. 1, 2 and 20.

There is disposed at one side of the assembled turret units 44 and 45 a bobbin feeding conveyor mechanism 65, FIGS. 1 and 2, which is housed in an open trough-like structure 66 fixedly secured to the frame structure 40 and having upright sides embracing the gap opening between the turret units 44 and 45 with the trough 66 extending longitudinally from said opening and terminating in a hopper portion 68 formed with a splay end wall 69. The filling carriers or bobbins B, FIG. 14, to be processed at the turret units 44 and 45 are transferred to the turret heads 46 and 47 of the latter one at a time upon being discharged from the conveyor bobbin carrier plates 70, FIGS. 13 and 15, as they reach the adjoining elevated end of the conveyor mechanism 65.

Bobbins B, thus received by the turret heads 46 and 47, are processed as they progress between the units 44 and 45, as will be hereinafter described, and drop out one at a time into individual bobbin carrier plates 72, FIGS. 1, 2 and 4, of a magazine loading conveyor mechanism 73 which is disposed at the discharge side of the turret units 44 and 45. The conveyor 73 is inclined upwardly and outwardly from the drop-out side of the turret units 44 and 45 and is supported in this position by an upright stand 74 mounted upon a frame extension member 75, FIGS. 1 and 2, suitably affixed to the top bed member 41 of the frame structure 40.

The conveyors 65 and 73 preferably are each of similar construction to the conveyor structure described and illustrated in the G. E. Repass co-pending United States application, Serial No. 557,799, filed January 6, 1956, now Patent No. 2,856,740, for Bobbin Loading Machine, so that a general description only of their respective structural organizations, supplemented by additional specific description of details where modified to adapt and apply them in a cooperating relationship to the present assemblage of turret units 44 and 45 will be given.

As illustrated in FIGS. 13 and 15, the bobbin feeding conveyor 65 comprises parallel chains 78 and 79 between which and carried by which are a series of bobbin carrier plates 70 of angular form and arranged to accommodate the bobbins which are to be carried therein. At the same side of the conveyor 65 as the chain 78 there is disposed a bobbin butt transfer guide 80 while at the opposite side at which is located chain 79 there is disposed a bobbin tip transfer guide 81, both of said guides having arm members 82 and 83, respectively, projecting forwardly beyond the bobbin delivery end of the conveyor 65 and extending into the gap opening between the turret heads 46 and 47 and in adjacency to the bobbin butt holders and bobbin tip holders, respectively, carried by the turret heads, the purpose of which guides will be hereinafter explained.

The arm member 82 of the butt transfer guide 80 has an upturned curved end portion 84, and this engages under the end portion of the main yarn mass or thread package P adjacent the butt of the bobbin, see FIGS. 13 and 15. A bobbin butt engaging spring check 85 and a bobbin package engaging spring check 86 are provided for preventing a bobbin B from jumping out of the arm members 82 and 83 of the butt transfer guide 80 and the tip transfer guide 81 when sustained by the transfer guides after being discharged onto the same from the turret feeding conveyor 65 and before being engaged and transferred therefrom onto one of the pairs of bobbin butt holder and bobbin tip holder instrumentalities of the turret heads to be sustained and carried thereby into the bobbin treating zone defined between the turret units 44 and 45. These bobbin checks 85 and 86 are mode of resilient sheet metal, the former being in narrow strip form having an upturned circularly curved end 88 while the latter has the form of a convex plate having an upturned circularly-concaved broad end portion 89, the width and radius of curvature of these respective curved end parts corresponding substantially to that of the wooden butt end and of the main yarn package P, respectively, which are engaged by these particular elements.

A stationary cross shaft 90 disposed laterally of the conveyor 65 serves as a common support to which the other end of each of these checks 85 and 86 are hinged, as by means of brackets 91 and 92, 93, respectively. The spring check members 85 and 86 are adjustable on their respective clamping brackets.

The shaft 90 has its opposite ends affixed in suitable upright brackets 95 and 96 which are disposed at opposite sides of the conveyor 65 and bolted to the side rails thereof. A leaf spring pressure finger 97 bears at one end against the top of the bobbin in the carrier through an opening in the spring check 86 and is upwardly curved therefrom and adjustably attached to an arm 98 of a bracket 99 which is clamped to the shaft 90. Lateral shifting movement of the spring check 86 is prevented by a collar 100 fast on the shaft 90.

Chains 78 and 79 of the turret feeding conveyor 65 are driven through suitable sprockets 105 and 106, FIGS. 13 and 15, secured to a shaft 107 suitably journaled in the frame of the conveyor and driven from a shaft 108, FIGS. 10 and 11, by a flexible chain-type sprocket coupling 109 made up of sprocket 110 attached to an extended portion 111 of shaft 107 adjacent to the turret head 45, sprocket 112 secured at the outer end extension 113 of a stub shaft 108, and chain 114 of double width. This chain serves to couple sprockets 110 and 112 which are opposed or positioned back to back and this chain may be readily removed and replaced to rotate one sprocket and its shaft relative to the other for timing purposes.

The use of the above type of sprocket coupling 109 compensates for any slight misalignment in the shafts 107 and 108. It is intended that all bobbins be fed by the conveyor 65 and passed therefrom through the turret section of the machine with the bobbin butts facing the direction of the turret head 46 and the tips toward the turret head 47. To this end, the turret conveyor 65 may incorporate a bobbin ejector arrangement similar to that disclosed in the above-identified copending U.S. application, Serial No. 557,799. This is depicted in FIGS. 1 and 3 and includes hinged ejector cover members 115 and 116 spaced apart to provide a bobbin ejector space 117. If a bobbin is directed reversely in a bobbin carrier plate 70 of the conveyor the bobbin is raised and knocked out by an elevating cam (not shown) against an inclined abutment 120 on the plate 115 adjacent the ejector space 117 and by the action of a flipper spring 121 attached to the abutment 120 the bobbin is deflected on top of plate 116, guided by arcuate abutment 122, rolls or slides down to the rear side of the conveyor 65 to fall through a side opening 123 and into a suitable container 124, FIG. 3. A suitable electric switch LS–1, FIG. 31, may be provided which will be actuated upon lifting of either of the ejector cover members 115 or 116 to energize the motor brake solenoid 3–SOL and stop the machine at the occurrence of a bobbin jam or of cocked bobbins on the turret charging conveyor 65.

The magazine loading conveyor 73 includes a pair of parallel chains 125 and 126, as shown in FIG. 2, between which and carried by which are a series of bobbin carrier plates 72 of angular form and so spaced as to leave room for a bobbin to be carried. These plates 72 operate between the parallel angle iron side members 128 and 129 which are suitably attached to the stand 74.

Chains 125 and 126 run over suitable sprockets (not shown) on a shaft (not shown) at the elevated delivery end of the conveyor. These chains are driven at their lower ends by sprockets (not shown) fixed on a shaft 130, FIG. 9, suitably journaled in the turret units 44 and 45 and connected by a chain-type sprocket coupling 131 to a stub shaft 132 journaled at one end in a bracket 133 affixed to the inside wall face of the turret housing 50 and at the other end in a bearing unit 134 mounted in a lower bearing housing part of an upright bearing stand frame 135.

The stub shaft 108 for driving the turret feeding conveyor is mounted on the stand frame 135 in a manner similar to the stub shaft 132 but at a higher position.

Disposed behind and in substantial alignment with the stub shaft 132 is the outer extension of a countershaft 136 of the gear transmission unit 57 and on which extension is mounted an eccentric or crank 137 which by its connecting link 138 rocks a crank arm 139 and cross-shaft 139′, FIG. 11, for actuating suitable linkage (not shown) of the magazine-loading conveyor 73, to impart clawing movements to a ratchet wheel (not shown) and an indexing disk (not shown) for releasing a desired number of accumulated bobbins from an accumulator unit (not shown) into each column of a magazine $M_b$, FIGS. 1 and 2. Both the indexing disk and the ratchet wheel have the same number of teeth and depressions, respectively, as there are bobbins accumulated in the accumulator unit, and such number of accumulated bobbins are loaded in each column cell of the magazine $M_b$ in response to a corresponding number of clawing motions imparted to the ratchet wheel by the linkage connections thereto from the crank arm 139.

The magazine $M_b$ may be supported on a pair of inclined track members (not shown) so as to travel by gravity underneath and along the length of the loading frame extension member 75 of the machine frame structure 40.

*General Drive*

Referring now to FIGS. 9, 10, 11 and 21, the main drive for the conveyors 65 and 73 and the turret heads 46 and 47 is effected by means of an endless chain 140 which is driven by a sprocket 141 mounted on the outboard end of the outer extension of input shaft 58 of the gear transmission unit 57. This chain 140 extends around a sprocket 142 fast on the stub shaft 108 and drives the turret feeding conveyor 65, thence under and upwardly from a chain tightener sprocket 143 and around a large diameter sprocket 144 which is secured to a shaft 145 interconnecting and keyed to both turret heads 46 and 47 for driving them in unison. The shaft 145 is journaled at one end in an anti-friction bearing unit 146 within the turret unit 45 and has its other end journaled in an anti-friction pillow block 147 mounted on the top of the upright bearing stand frame 135.

From the turret driving sprocket 144, the chain 140 has a downwardly directed run which extends under and around a sprocket 148 fast to the stub shaft 132 which drives the magazine loading conveyor. The chain 140 then travels upwardly over the top of an idler sprocket 149 and thence downwardly to return about its driving sprocket 141 on shaft 58.

It thus will be apparent that both conveyors 65 and 73 and the turret heads 46 and 47, all are driven in timed relation and in unison by the endless chain 140.

*Turret Units and Drive*

The turret heads 46 and 47 of the turret units 44 and 45, respectively, are of similar construction insofar as they are made up of duplicate circular plate members or spiders 150 and 151, respectively, FIGS. 7 and 9, provided with central hubs 152 and 153 and having integral with and projecting perpendicularly from their respective inside faces a circularly arranged series of tubular stub-like housings 154 and 155, respectively. These housings movably mount and support the respective butt holder devices 156 and tip holder devices 157, which are adapted, as will be hereinafter described, to cooperate in pairs to receive transferred bobbins B from the conveyor 65 and sustain and rotate them individually with their respective axes horizontal across the space intervening between the turret heads 46 and 47.

The tubular housings 154 and 155 have their centers serially disposed and equally spaced on a circular arc close to the peripheral edge of the plates 150 and 151. Since the constructional arrangement of all the bobbin butt holder devices 156 and of all the bobbin tip holder devices 157 are identical, the description of one, in each case, will suffice for the others of each series.

As illustrated in FIG. 12, each bobbin butt holder device 156 comprises a butt spindle 160 of a stepped formation terminating in a slender stem 161, the spindle being disposed axially and completely through the cylindrical bore 162 of the tublar housing 154. The spindle 160 is rotatably mounted in the housing 154 by means of front and rear anti-friction bearing units 163 and 164, the former being press-fitted into a front counterbored portion 165 of the bore 162, while the rear anti-friction bearing unit 164 has a tight fit with the wall of the bore 162 at its rearward end portion. The stem 161 projects outwardly of the counterbore 165 and beyond the front face of the turret head 46 and mounts a bobbin butt driver element 166 which is pinned to the stem as by a suitable pin 168. In the form illustrated, the butt driver element 166 includes a centering plug element 169 adapted for insertion into the usual cavity at the end of a bobbin butt. An annular ring member 170 of suitable friction material is carried by and encircles the base of the plug element 169 for frictionally driving the bobbin butt when the latter is pressed into engagement therewith by the action of the companion tip holder device 157, as will be hereinafter described.

In the event that the tail wind e is held to the bobbin butt by a back wind thereon, a saw-toothed cutter 171 is arranged to engage and sever the caught end as the transferred bobbin is forced onto the butt drive element 166.

The front face of the turret head 46 carries a circularly arranged series of bobbin butt rests or cradles 172, FIG. 10, each of which is in the form of an individual bracket having an elongated inclined plate portion 173 which is circularly curved at one end as at 174 to a radius of curvature corresponding to that of a bobbin butt, this curved end being disposed in a concentric relation to the bobbin butt driver element 166 to form a temporary rest for the bobbin butt immediately at transfer of the latter from the arm member 82 of the butt transfer guide 80 on the turret feeding conveyor 65.

Each of the butt spindles 160, see FIG. 12, has keyed to its projecting rear end portion a pinion 176 and these pinions are driven individually and collectively by a sun gear 177, FIGS. 5, 9, 10, 11 and 12, having its central hub 178 freely rotatable on turret drive shaft 145. Integral with the sun gear hub 178 is a sprocket 179 which is connected by an endless chain 180 to a larger sprocket 181 affixed to the outer extension 184 of shaft 135 of the gear transmission unit 57, FIG. 21, the sprocket 181 thus driving the sun gear 177 to rotate it independently on the shaft 145 at a much faster rate than the rotation of the latter in turning the turret heads and thus drive the butt spindle pinions 176 at relatively high speed.

As illustrated in FIG. 8, each bobbin tip holder device 157 comprises a retractile, non-rotatable plunger assembly generally designated at 190, which is supported for axial movement in the housing 155 by annular flanged sleeves 191 and 192 disposed and fixedly secured at the front and rear, respectively, of the housing 155. This plunger assembly 190 includes a winding head 193 fixedly mounted at the forward end of a tubular member 194 which has its main body portion slidably supported in and extending outwardly through the front sleeve 191, and has a stepped rear portion 195 pinned as at 196 to one end of a rod member 197, the other end of which extends through and is slidably supported by the rear sleeve 192. Affixed to the outer end extension of the rear portion of the rod member 197 is a flanged bracket 198 on which a cam follower roller 200 is mounted for free rotation by means of a fixed stud 201 which is secured to the bracket by a suitable lock nut 202. A coiled compression spring 204 encircles the rod member 197 and has one end bearing against the inner face of the flanged sleeve 192 and the other bearing against the adjacent face of an annular ring member 205 which encircles and engages the shouldered abutment of the reduced stepped portion 195 of the tubular member 194 whereby the normal expansive action of the spring 204 tends to propel the forward end of the main body of the tubular member 194 along with its winding head 193 into an outwardly projected position beyond the housing 155, as depicted in FIG. 8. The follower mounting end of rod 197 is squared so that it may not turn in its bearing (also squared) and thus head 193 is maintained in non-rotative relationship to the end plate or head 151.

This condition exists from the time a bobbin is received and sustained by the butt holder and tip holder devices 156 and 157, respectively, until the bobbins B have been revolved with the turret heads 46 and 47 and carried by them to the drop-out point of the turret units 44 and 45 where they are released and fall by gravity into the magazine loading conveyor 73. A cam member 207, FIGS. 6 and 7, effects the release of the bobbins B just prior to their arrival at the drop-out point by being successively engaged by the respective cam follower rollers 200 of the series of plunger assemblies 190 to thereby produce retraction of the winding heads 193 along with their tubular supports 194 relative to their particular housing 155 with resultant compression of the spring 204.

The cam member 207 is shown in FIG. 6 as being of arcuate form and is provided with suitable slots 208 through which pass bolts 209 which fixedly secure the cam to the inner face of the end wall of the portion of the turret housing 51 that includes the turret head 47. The camming surface 210 of the cam 207 is disposed along a circular arc which is concentric with the main drive shaft 145 of the turret head 47.

As illustrated in FIGS. 8, 16, 17 and 18, each of the winding heads 193 is in the form of a metal block 215 which is circularly curved at its upper part and square-sided at its lower righthand corner, and the central portion of the block has a circular opening 216 therethrough of a size to fit onto the tubular tip portion 217, FIG. 8, of a tubular insert 218 which is telescoped in the bore 219 of the projecting end portion of the tubular member 194 of the plunger assembly 190. Screw 221 secured the insert 218 in place therein. Thus, only the small, freely rotatable chuck member is rotatable as the bobbin is rotated. The block 215 is split as indicated at 222 to permit it to be clamped onto the tubular tip portion 217, as by means of a suitable set screw 223.

Disposed in advance of the circular opening 216 and at opposite sides thereof is a curved hook member 225 and an anvil or rest element 226, respectively, the latter being situated at the right side of the central opening 216, as viewed in FIG. 17.

The hook 225 is integral with the upright arm of an L-shaped plate 227, the other arm perpendicular thereto being bolted by bolt 224 to the underside of the block 215. The anvil element 226 is held by bolt 228 and mounted upon the latter arm, and has a flat top 229 that is inclined in a direction to coincide with a line substantially tangent with the lower curve of the circular opening 216.

At transfer of a bobbin B from the conveyor 65 to the turret heads 46 and 47 the wooden tip end of the bobbin is received by the flat top surface 229 of the anvil 226 and as the bobbin is elevated by the turret heads immediately after the transfer operation the bobbin tip will roll along the anvil top and into the central opening 216 where it is received by the concave end face of the head 230 of a stem element 231 and rotates therewith as the latter turns on a pair of anti-friction bearings 232 and 233 suitably secured in the bore of the tubular insert 218. Thrust is taken by a bearing 233'.

The hook member 225 is flared outwardly at an acute angle (see FIGS. 16 and 18) so that its tip is directed toward and into the field of action of the ballooning thread end "e" of the tip bunch "b" of the bobbin B as the latter rotates with the stem head 230 whereby the tail wind "e" is caught onto the hook member 225 (see FIG. 19) and is guided thereover and tensioned a little by the tips of the bristles of brush 235 as it is pulled from the surface of the package and is wound onto the prior-wound turns of the end-finder tip bunch b of the bobbin. The brush 235 has its bristles secured in an angular hole 236 in the arcuate upper part of the block 215 of the winding head 193 and the exposed lower ends of these bristles terminate behind the base of the hook member 225 and extend into substantial coincidence with the contiguous circular limits of the central opening 216 of the block member 215. The brush 235, being angularly directed, bears down onto the coils of the tip bunch within the winding head 193 to prevent such coils from sloughing off the bared terminal tip end of the bobbin core.

Compressed air means are provided to assist in lifting off the tail wind e, initially clinging to the exterior of the main thread package P, during rotation of the bobbin B on the butt holder and tip holder devices 156 and 157, respectively, in order that the thread end thus lifted and free may be drawn readily over the hook member 225 as it is being wound onto the tip bunch b of the rotating bobbin. To this end, a stream of compressed air is directed from a nozzle 240, FIGS. 3 and 4, toward the tapered end portion of the main thread package P adjacent the tip bunch b of the bobbin to loosen and lift off the tail wind e. While this occurs the rotating bobbin is carried upwardly and moved past nozzles 241 and 242 which direct angular streams of compressed air against opposite sides of the bobbin and at the now loosened thread end e to balloon the same sufficiently to be caught onto the hook 225. A brush 243 restricts the outward ballooning of this thread end. Simultaneously with the advancing movement of the bobbin B by the turret heads 46 and 47 into the field of action of the nozzles 241 and 242, the tip bunch b passes under and rubs against the bristles of a helically disposed series of upper brushes 244 and an opposite series of lower brushes 245, the bristles of which act to crowd the thread coils of the tip bunch b into their proper location with respect to the main yarn package P. The brush array 244 has its brush holders affixed to a downturned arm 246 suitably attached to the cross-brace 52.

The nozzles 240 and 241 are connected by suitable lengths of tubing 247 and 248, respectively, and a T-pipe connector 250 to a drilled bore in the cross-brace 52 which serves as an air distributor member and to which compressed air is supplied via pipe 251, the lower end of which is connected to the output side of an air-control valve 252 which is solenoid operated. Nozzle 242, which is situated above the main turret drive shaft 145 and enclosed by a circular guard 253, also is connected to the output side of the main air-control valve 252 by a pipe 254. An upright bracket 255 supports the nozzle 242 and the holder of brush 245. Valve 252 has its input side connected by a pipe 256 to an air pressure regulator 257 to which compressed air is supplied by an air line 258, FIG. 22, from a suitable supply source (not shown), this air regulator device being regulated manually by a control knob 259 so as to be admitted into the air piping system to the nozzles at a predetermined pressure reading as indicated on the air gauge indicator G. Solenoid air-control valve 252 is of a known type that is normally spring-biased into a closed position, and is opened to pass air therethrough upon energization of its solenoid.

The nozzles 240 and 241 may be of similar construction and consist of the flattened ends of the tubing 247 and 248, respectively. Nozzle 242 may have the construction shown in FIGS. 27–30, inclusive, and formed of two plate members 260 and 261 each having recessed faces as indicated at 262 and 263, respectively, which are suitably bolted together, as by a bolt 264, and as thus assembled define therebetween an air chamber 265 that is supplied with compressed air by the pipe 254 connected thereto. The plate member 260 also is undercut at one end so as to form a narrow, elongated, slit-type air opening 265', FIGS. 28 and 30, at the parting plane of the end joint between the two plate members. The plate member 261 may or may not be provided with a mounting bracket element 266 for adjustable attachment, as by bolt 267, to the forked stem 268 of a swivel type supporting member 269, FIG. 27.

A manual self-restoring central switch operating device is provided as indicated at 270, for selectively operating the respective actuator elements of a pair of micro-switches MS–1 and MS–2, FIGS. 22–25 and 31. The device 270 includes a switch mounting bracket 271 having a main body portion 272 of generally H-shape formation made up of a pair of substantially parallel tubular bosses 273 and 274 integrally connected together by a cross-web member 275. Oppositely extending flanges 276 and 277 are formed integral with the respective base portions of the bosses 273 and 274 and these flanges in conjunction with bolts 278 and 279 effect the mounting of the main body part 272 of the bracket to the inner face of a vertical panel plate 280, FIGS. 1, 2, 24 and 25, the bosses 273 and 274 being disposed vertically when so attached. The micro-switches MS–1 and MS–2 are mounted in tandem on the body part 272 between a pair of outstretched arms 281 and 282 by means of a pair of bolts 283 which pass through the casings of both micro-switches and have screw-threaded connection with a pair of ears 284 and 285 disposed opposite to one another and integral with the tubular bosses 273 and 274, respectively.

The micro-switches MS–1 and MS–2 each are conventional and carry individual roller-lever type actuators, as indicated at 287 and 288, respectively, FIGS. 24 and 25. In order to selectively raise and lower the actuators 287 and 288, an actuating shaft 290 is provided which extends horizontally and completely through the turret housing 51, FIG. 23, and has its opposite ends projecting exteriorly therefrom through suitable bearing elements 291 and 292, the former being on the front panel plate 280 and the latter being mounted on a wall of the turret housing 51. Affixed to the respective externally projecting ends of the shaft 290 are a pair of manual ball-type operating levers 294 and 295 for actuating the shaft 290 and a switch trip lever 298 which is fast thereto, and may be swung from left to right, and vice versa, whereby the shaft 290 and the trip lever 298 will be rocked in the turret housing 51 by appropriate swinging movements of either hand-lever 294 or 295 from a normally vertical position to actuate the micro-switch MS–1 or MS–2; the particular hand-lever used being dependent upon whether the operator is standing near the panel 280 or at the opposite side of the turret housing 51.

The switch trip lever 298 includes a tubular hub 299 having integral therewith a pair of oppositely extending flat plate-like arms 300 and 301 of equal length, said arms having their flat top surfaces disposed in the same horizontal plane and respectively formed at diagonally opposite locations on such top surfaces and adjacent their free ends with two flat inclined pad elements 303 and 304 for engagement with and along which the usual rollers of the lever actuators 287 and 288 roll when pushed upwardly by the respective lever arms 300 and 301 as the ends of the latter are tilted upwards upon appropriate manual swinging movement of the shaft 290 by operating lever 294 or 295.

Integral with the arms 300 and 301, respectively, are a pair of flat wing-like projections 305 and 306, FIG. 26, which are disposed above and at opposite sides of the hub 299. These projections serve as abutments against which push the lower ends of a pair of spring-pressed plungers 308 and 309, respectively. These plungers continuously bear down upon the tops of the winged projections 305 and 306 and apply the necessary force to restore the trip lever 298 to a horizontal condition and in equilibrium after it has been tilted in either direction by its actuating shaft 290 and lever 294 or 295, as the case may be, to raise the arm 300 or 301 for effecting actuation of either micro-switch MS–1 or MS–2.

The degree of upward tilting movement of the arms 300 and 301 is regulated and limited by the position at which the heads of a pair of studs 310 and 311, respectively, are set, these studs having screw-threaded connection with the arms 281 and 282, respectively, and depending therefrom. The stud heads serve as stops against which the top surfaces of the arms 300 and 301 of the trip lever strike during their respective extreme swinging movement. Lock nuts 312 and 313 secure the studs 310 and 311, respectively, in their adjusted settings.

Now referring to FIG. 31, there is schematically represented in that figure a circuit diagram of the electric circuits employed for the various electrical components utilized in the illustrated embodiment of the invention. Therein M indicates the three-phase electric motor 55 having the built-in clutch and brake mechanisms that are solenoid controlled. The motor M is supplied with electrical power from the mains M–1, M–2 and M–3 through line switch 316 which may be enclosed in a suitable switch box, as in conventional practice. This line switch also controls the application of electric current to primary TP of the transformer T through branch conductors B–1 and B–2. MSC designates the starter coil winding of the motor M energizable through the transformer secondary TS at lower voltage than the mains. A control relay CR also is energized by the output voltage from the transformer secondary TS. CRC–1 and CRC–2 are a pair of normally open electrical contacts of the control relay CR which maintains the solenoid 1–SOL of air valve 252 energized and the valve held in opened position after being initially energized by the actuation of micro-switch MS–1. CRC–3 is a pair of normally closed electrical contacts which control brake solenoid 3–SOL. Solenoid 2–SOL actuates the motor clutch mechanism and is controlled by micro-switch MS–1. Solenoid 3–SOL actuates the brake mechanism of the electric motor and is controlled by micro-switch MS–2. OL–1 and OL–2 are conventional overload coils in motor feeder lines L–1 and L–3, respectively. The particular circuits may be suitably protected in a conventional manner, as indicated by fuses F–1, F–2, F–3, F–4, F–5, F–6 and F–7.

*Operation*

Now, having described its mechanism, the detailed operation of the machine will be explained with particular reference to FIGS. 1, 2, 3, 4, 22–25 and 31. Assuming, first, that the rotary bobbin carrier arrangement formed by the oppositely disposed turret heads 44 and 45 is stopped and also devoid of bobbins B required to be processed and, secondly, that both conveyors 65 and 73 also are stopped, the machine will be put in readiness for carrying out its intended operations when the operator presses the "Start" push-button PB–2 of a push-button control switch 315 to start the main drive motor 55 (while its brake is on) following the prior closure by him of the line switch schematically indicated at 316, FIG. 31, to connect the feeder lines L–1, L–2 and L–3 of the main drive motor to the three-phase A.C. power supply mains M–1, M–2 and M–3. When power is on normally open points M are closed.

Next, the setting of the air pressure regulator 257 is checked, and adjusted, if necessary, to the proper setting to regulate the air pressure of the compressed air supplied from air line 258 to the piping system for the nozzles 240, 241 and 242 at a desired value, such as, for example, in the range of from 15 to 25 pounds per square inch, as indicated by the pointer and scale reading on the air gauge indicator G. In most instances, satisfactory results are attained with air at a pressure of substantially 20 pounds per square inch.

The machine is now readied for operation except for the depositing of bobbins B in the hopper 68 of the conveyor 65, which may be done at this time, or before, and, of course, any time while the machine is running. The conveyors 65 and 73 and the turret heads 44 and 45 now are set in motion when the operator swings the hand lever 294 to the right as viewed in FIG. 22, or conversely, hand lever 295 to the left, if viewed at the right of FIG. 23. Following this act, the operator releases the lever which then returns itself automatically to a neutral or midposition due to the action of the spring-pressed plungers 308 and 309 on the winged projections of the switch trip lever 298.

This initial movement of hand lever 294 or 295 rocks the arm 300 of the switch trip lever 298 upwards, see FIG. 24, to the position depicted therein at the left in broken outline thereby elevating the roller actuator of micro-switch MS–1 by pad 303 into circuit-closing position to effect energization of the clutch operating solenoid 2–SOL, FIGS. 20 and 31 and throw in the usual clutch at the motor 55, which already is running, thereby driving the speed reducer 56. At that time normally opened points CRC–1 and CRC–2 close and points CRC–3 open to release the brake. This, in turn, produces rotation of the output shaft 62 of the speed reducer, which rotation is transmitted via power-transmission chain 59 and sprockets 60 and 61 to the input shaft 58 of the reversible type gear-transmission unit 57.

Shaft 58, FIGS. 20 and 21, is driven and drives shaft 136 through gears 320, 321, 322 and 323. Gears 320 and 323 are pinned to their shafts while the gears 321 and 322 are fixed to or integral with a hub 324 which is freely rotatable on shaft 184.

The shaft 135 may be driven in either direction by a reversing gear. Gears 325 and 326 integral with or fixed to a single hub are slidable along shaft 58. The hub is keyed to turn with the shaft and an extending hub end 327 is grooved for reception of a fork 328 fast on the end of a spindle 329. This latter is hand operated by knob 330 to move the hub and gears to either of two positions.

In the position shown the drive is from gear 325 to gear 331 through an intermediate gear 332. When moved to the dot-and-dash line position it is from gear 326 to gear 333. Both gears 331 and 333 are pinned to shaft 135. Obviously in one setting shaft 135 is rotated in one direction and in the other position the gears give an opposite drive to take care of rotating the packages either right or left handedly as may be desired to take care of bobbins with right or left hand winding. Of course the remaining functions are carried on with a single direction of rotation.

After the turret heads 46 and 47, conveyors 65 and 73 have been set in motion, as above described, all in timed relation with each other by reason of the described drive arrangement the series of bobbins B delivered separately and successively onto the bobbin butt holder devices 156 and bobbin tip holder devices 157 are sustained and individually rotated thereon as they are caused to move progressively between the turret units by the rotative motion of the turret heads 46 and 47. As the rotating bobbins progress bodily in this fashion they are individually subjected to the air jet action of nozzles 240, 241 and 242, as previously described and also to the brushing action of brush array 244 and brush 245 whereby the tail wind *e* is loosened and dislodged from its normally clinging position on the side of the bobbin thread package P. Also, the bristles of brushes 244 and 245 push or crowd the whole tip bunch on the bobbin tip to its proper position thereon.

The thread end *e* thus lifted and freed by the air jets is ballooned over and caught on the hook member 225 of the winding head 193 and is drawn endwise of the bobbin by rotational action of the rotating bobbin and guided over the hook 225 onto the courses of the bobbin tip bunch *b* while being tensioned by the bristle ends of brush 235 on block 215 of the winding head 193. By the time all the foregoing has occurred each bobbin has been properly rectified and has made an orbit of slightly greater than 180° from its point of ingress to the turret units to its drop-out position therefrom onto a bobbin carrier plate 72 of the magazine loading conveyor 73.

The machine is stopped when the operator swings either hand lever 294 or 295 toward the bobbin butt holder devices 156 thereby rocking shaft 290 and raising arm 301 of the switch trip lever 298 to actuate micro-switch MS-2 and effect energization of solenoid 3-SOL which through linkage 64 disengages the clutch mechanism in the motor 55 and applies the brake device thereof.

It will be seen from the foregoing description that when once placed in operation the machine is completely automatic, the entire tail wind being removed from the package and either added to a partial preexisting tip bunch or an entire tip bunch may be formed therefrom, all while the bobbins are continuously rotating in a winding direction. It is only necessary to feed bobbins to be conditioned to the receiving conveyor. That may, of course, be done by hand, but such a system of supply would not be economical in production. It is therefore contemplated that this apparatus shall be so arranged as to be fed from a line of spinning or winding equipment between which and the instant machine there may be some form of conveyor means. Such is not a part of this invention and need not be described here.

While one embodiment of the invention has been disclosed, it is to be understood that the inventive concept may be carried out in a number of ways. The invention is, therefore, not to be limited to the precise details described, but is intended to embrace all variations and modifications thereof falling within the spirit of the invention and the scope of the appended claims.

We claim:

1. A method of refining thread packages on bobbins of the type described which have in addition to a main package body, a tip finder bunch and a tail wind, which comprises the steps of rotating the bobbin and package, stripping the tail wind from the surface of the package body and guiding it to be wound on the tip bunch previously formed.

2. A method of refining thread packages on bobbins of the type described which have in addition to a main package body, a tip finder bunch and a tail wind, which comprises the steps of rotating the bobbin and package, applying a stream of air against said package to loosen said tail wind, and then guiding that thread end to be wound on the tip bunch previously formed.

3. A method of refining thread packages on bobbins of the type described which have in addition to a main package body, a tip finder bunch and a tail wind, which comprises the steps of rotating the bobbin and package, applying a stream of air against said package to loosen said tail wind, and then mechanically lifting the thread end and guiding it into a plane to wind on the previously formed tip bunch as the bobbin is rotated.

4. An apparatus for rectifying thread packages on bobbins of the type described which have in addition to a main package body, a tip finder bunch and a tail wind, including in combination means for progressing bobbins and packages thereon through said apparatus, means for stripping the tail wind from its position on the package and winding it upon that tip bunch which had previously been formed on the bobbin and then discharging bobbins and packages thus treated.

5. An apparatus for rectifying thread packages on bobbins of the type described which have in addition to a main package body, a tip finder bunch and a tail wind, including in combination means for progressing bobbins and packages thereon through said apparatus, pneumatic means for stripping the tail wind from its position at the surface of the package and other means for guiding that thread end into a plane to be wound at the top of the previously formed tip bunch while rotating the bobbin and package.

6. An apparatus for rectifying thread packages on bobbins of the type described which have in addition to a main package body, a tip finder bunch and a tail wind, including in combination means for progressing bobbins and packages thereon through said apparatus, pneumatic means for stripping the tail wind from its position at the surface of the package and mechanical means including brushes for guiding that thread end into a plane to be wound at the top of the previously formed tip bunch while rotating the bobbin and package.

7. An apparatus for rectifying thread packages on bobbins of the type described which have in addition to a main package body, a tip finder bunch and a tail wind, including in combination means for progressing bobbins and packages thereon through said apparatus, means for rotating each bobbin and package during its progression therethrough, means including an air jet for directing air under pressure against each rotating package to loosen the tail wind thereon, and other means including a hook-like member for lifting said tail wind and guiding it toward the tip bunch previously formed to wind it thereon.

8. Mechanism as defined in claim 7 wherein other means including brushes are provided for assisting in freeing the tail wind from the package.

9. Mechanism as defined in claim 7 wherein means comprising bristles is provided for assisting said hook-like member in winding the tail wind on said tip bunch.

10. Mechansm as defined in claim 7 wherein said means for progressing bobbins and packages comprises chucking means between which a bobbin is held, means for rotating one said chucking means to rotate the bobbin, and cam controlled means functioning on said chucking means to cause it to grip a bobbin as it enters the apparatus and to release it upon exit therefrom.

11. Mechanism as defined in claim 7 wherein said means for progressing bobbins and packages comprises rotary heads, means to rotate said heads in synchronism, aligned chucking means carried by each head, and means for rotating each of said chucking means at one of the heads which includes sun and planet gears.

12. Mechanism as defined in claim 7 wherein said means for progressing bobbins and packages comprises heads, means to rotate said heads in synchronism, aligned chucking means carried by each head, gearing for positively rotating those chucking means carried by one said head, chucking means at the other of said heads comprising freely rotatable bobbin end restraining means and cam means operable upon said last mentioned chucking means for withdrawing each axially to grip and to release bobbins.

13. Mechanism as defined in claim 7 wherein said means for progressing bobbins and packages comprises rotary heads, means to rotate said heads in synchronism, aligned chucking means carried by each head and means for rotating each of said chucking means at one of said heads to rotate the bobbins independently of their movement of progression and means for varying said means for rotating said chucking means to drive in either a clockwise or counterclockwise direction.

14. Mechanism as defined in claim 12 wherein chucking means which are rotated by gearing are provided with a means to enter a bobbin butt and other means for frictionally imparting torque to the bobbin through its butt.

15. Mechanism as defined in claim 12 wherein that chucking means second mentioned comprises a non-rotatable, axially movable member, an end lifting and guiding hook fixed to said member at its bobbin tip engaging end and a bobbin tip support and bearings internally of said non-rotatable member on which said support is freely rotatable.

16. An apparatus for rectifying thread packages on bobbins of the type described which have in addition to a main package body, a tip finder bunch and a tail wind, including in combination means for progressing bobbins and packages thereon through said apparatus, means including a sun and planet gears for rotating each bobbin and package during its progression therethrough, and pneumatic means and mechanically operative means for loosening said tail wind so that as the package is rotated it may balloon outwardly, and a relatively stationary hook-like member for engaging said tail wind and pulling it from the surface of the package and winding it on the already existing tip bunch.

17. Mechanism as defined in claim 16 wherein said hook-like member is a part of a centrally apertured bobbin tip guide and comprises a notched, angularly bent point, the notched portion of which aligns substantially with the tip bunch of a bobbin being treated and the tip of which is positioned to engage the tail wind at the package side of the tip bunch.

18. Mechanism as defined in claim 17 wherein supplementary means including a tuft of bristles is provided for urging the tail wind toward the bobbin tip and into surface contact with the tip bunch.

19. A method of refining a thread package and tip bunch combination on a bobbin which includes the steps of removing a tail wind left on the package as originally formed and winding it at the surface of the existing tip bunch.

20. A method of refining thread packages on bobbins of the type described which have in addition to a main package body, a tail wind, which comprises the steps of rotating the bobbin and packages continuously in a winding direction, then, while so rotating said bobbin and package stripping the tail wind from the surface of the package body and guiding said tail wind to the bobbin tip and there winding the entire said tail wind in spaced relation with said main body.

21. An apparatus for rectifying thread packages on bobbins with a tip of the type described which have in addition to a main package body a tail wind, including in combination means for progressing bobbins and packages thereon through said apparatus, means for rotating said bobbins and packages thereon in a winding direction only, means for stripping the tail wind from its position on the package and winding the entire tail wind upon the bobbin tip in spaced relation with said main body and then discharging bobbins and packages thus treated.

References Cited in the file of this patent
UNITED STATES PATENTS

| | | |
|---|---|---|
| 2,035,721 | Reiners | Mar. 31, 1936 |
| 2,675,971 | Abbott | Apr. 20, 1954 |

FOREIGN PATENTS

| | | |
|---|---|---|
| 53,411 | Switzerland | Oct. 15, 1910 |